Nov. 29, 1927.
J. L. AVERY
1,650,926
DIRECT READING OUTSIDE AND INSIDE CALIPERS
Filed Nov. 29, 1922
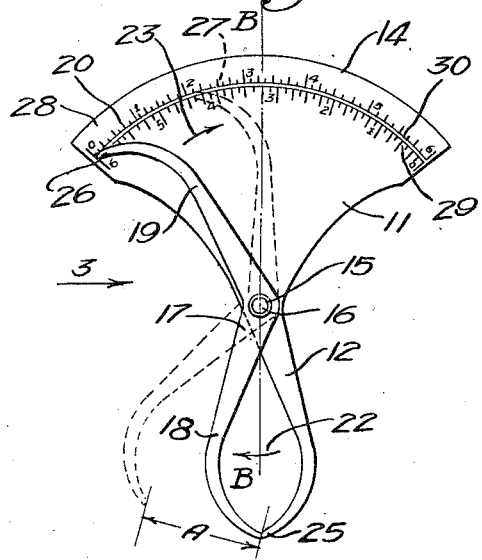
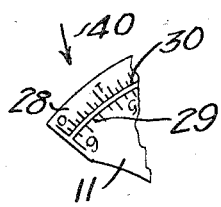
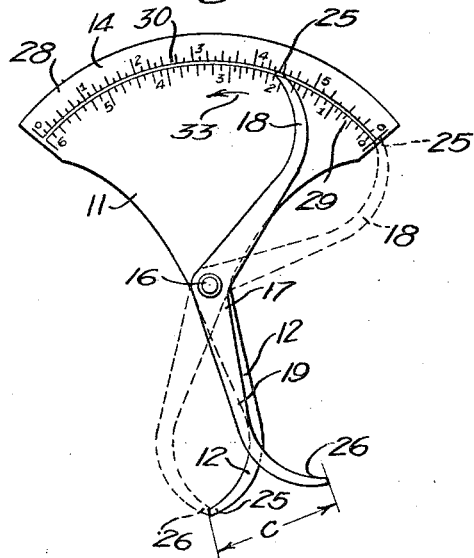
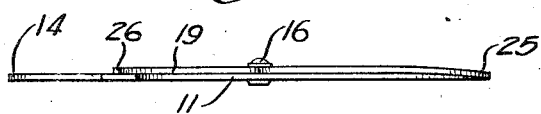
INVENTOR:
JOHN L. AVERY,
BY
Graham and Harris
ATTORNEYS.

Patented Nov. 29, 1927.

1,650,926

UNITED STATES PATENT OFFICE.

JOHN L. AVERY, OF LONG BEACH, CALIFORNIA.

DIRECT-READING OUTSIDE AND INSIDE CALIPERS.

Application filed November 29, 1922. Serial No. 603,969.

This invention relates to measuring instruments and has for its principal object to provide an instrument for taking internal and external measurements between points which are situated in depressions and to make unnecessary the moving of the legs of a pair of calipers with consequent destroying of the setting which has been made, in order to remove the calipers from the depression. This device provides a direct reading of the distance to which the points of the caliper legs are set, thus enabling the taking of measurements between depressions with accuracy and facility. The invention is adapted to the taking of inside or outside measurements by the reversing of the caliper leg, as will hereinafter be described.

The advantages of the invention and further objects thereof will be made evident hereinafter.

Referring to the drawing which is for illustrative purposes only,

Fig. 1 is a face view of my device as it is employed for outside calipering.

Fig. 2 is a face view showing the device arranged for inside calipering.

Fig. 3 is an edge view of the device as shown in Fig. 1, this view being taken as indicated by the arrow 3.

Fig. 4 is a fragmentary view showing the manner in which it is desirable to place the scale numerals on calipers employed for certain classes of work.

As shown in the drawing I provide a primary member 11 which provides a primary caliper leg 12 and a dial plate 14. The plate 14 may have the general form of a triangular sector, having one arcuate edge; and the entire member 11 is preferably stamped from sheet steel in substantially flat form so that the dial plate 14 and the caliper leg 12 will extend in a continuous plane. At a point 15 where the dial plate 14 and the primary leg 12 join, a secondary member 17 is mounted upon a rivet 16, or clamping screw as desired. The secondary member 17, shown as somewhat V-shaped provides a pair of legs 18 and 19 which are of equal length and are formed symmetrical with the leg 12; but instead of being placed to extend in the same diametral axis extended through the point of pivot 15, the legs 18 and 19 are placed at an angle to one another as shown, this angle being governed by the length of the arc through which the graduated scale 20 upon the dial plate extends.

With reference to Fig. 1 it will be perceived that as the leg 18 is moved relative to the leg 12, in a direction indicated by the arrow 22, the leg 19 will rotate in the direction indicated by the arrow 23. Thus when the points 25 of the caliper legs 12 and 18 have been spread apart a distance A, the point 26 of the leg 19 will have moved into the position indicated at 27 which is a distance away from the zero point of the scale equal to the distance A. By suitably graduating the dial plate 14, it is possible to read directly thereupon the distance the points of the legs 12 and 18 are spaced apart.

For the purpose of interior and exterior readings of the caliper, it is necessary to calibrate the graduations 20 from each end as indicated at 28 and 29, placing these calibrations above and below dividing lines 30. The arc through which the graduations 20 extend is preferably divided equally upon the central axis B—B of the primary member 11 so that when, for inside calipering, the secondary member 17 is swung through substantially a half revolution and the point 26 of the arm 19 brought adjacent to the point 25 of the arm 12, the point 25 of the arm 18 will coincide with the zero point of the interior reading scale 29.

From a comparison of Figs. 1 and 2, it will be perceived that for outside measuring, the arm 19 moves across the scale from left to right as indicated by the arrow 23, while for inside measurements the leg 18 must move upon the scale from right to left as indicated by the arrow 33 in Fig. 2. Any spread of the points 25 and 26 of the arms 12 and 19, such as the distance C, will be represented upon the scale 29 in the spacing of the end 25 of the arm 18 from the zero point of the scale. My device employs but a single dial plate upon which both the interior and exterior graduation are inscribed, and the legs 18 and 19 which adapt the calipers to interior and exterior measuring move upon this single plate in indicating the caliper readings.

An additional feature of the invention is that the calipers may be easily kept in accurate reading adjustment. It will be perceived that owing to the curve of the leg 19, the end 26 thereof approaches the scale graduations 20 at a considerable angle relative to a radial line extending across the point 26. Therefore, as the points 25 of the legs 12 and 18 become worn from wear allowing the legs to swing closer together, the face of the end 26 may be ground off to coincide with the zero reading on the scale 28 when the points 25 are together. For certain uses of the calipers, it may be desirable to reverse the scale graduations as indicated in Fig. 4, so that they may be read looking in a direction indicated by the arrow 40. This, however, is merely a matter of design and does not affect the principles of the invention.

From the foregoing description and the accompanying illustration, it will be understood that the primary leg 12 serves in both inside and outside calipering operations. The advantages of the calipers are that as well as being suitable for both inside and outside measurements, the settings of the legs may be read directly upon the respective scales.

I claim as my invention:

1. Calipers comprising: a primary member having a leg and a sector shaped dial plate having two arcuate scales thereon; and a secondary member so formed and so pivoted relatively to said primary member that the respective ends of said secondary member constitute legs having a fixed angular relationship and respectively suitable for use in the taking of inside and outside measurements, either of said legs being adapted to cooperate with the leg of said primary member in the taking of a measurement while the other of said legs coacts with its respective scale on the primary member to give a reading of the measurement taken.

2. Calipers comprising a member having a dial and a caliper leg extending in opposite directions from a central pivot point; said dial being provided with two scales reading in opposite directions; a second member pivoted to the first-named member at said pivot point and shaped to provide legs extending in opposite directions from said point, one of said legs serving as an indicator on one of said scales when the other is used with the first-named leg as outside calipers and the other of said legs serving as an indicator on the other scale when said other leg is used with the first-named leg as inside calipers.

3. Calipers including: a primary leg; a dial on said primary leg carrying two arcuate scales side by side; a secondary V-shaped caliper member, one leg of said member forming an inside caliper leg and the other leg of said member forming an outside caliper leg; said caliper member being pivoted at its vertex to said primary leg, so that said outside caliper leg will point to one of said scales to indicate inside measures between said inside leg and said primary leg, and so that said inside leg will point to the other of said scales to indicate outside measures between said outside leg and said primary leg.

4. Calipers including a primary caliper member having a leg and a dial plate carrying two arcuate scales side by side; and a secondary caliper member comprising a pair of caliper legs, said secondary caliper member being pivoted upon said primary member so that either leg of said secondary member may be made to cooperate with a corresponding one of said scales to indicate respectively outside and inside measures between the other leg of said member and the primary leg.

5. Calipers comprising: a member having a dial and a caliper leg extending in opposite directions from a central pivot point, said dial being provided with two scales reading in opposite directions; a second member pivoted to the first-named member at said pivot point and shaped to provide legs extending in opposite directions from said point, one of said legs serving as an indicator on one of said scales where the other is used with the first-named leg as outside calipers and the other of said legs serving as an indicator on the other scale when said other leg is used with the first-named leg as inside calipers.

6. Calipers including: a primary member having a primary leg and a dial carrying two arcuate scales side by side; a secondary V-shaped caliper member, one leg of said member forming an inside caliper leg and the other leg of said member forming an outside caliper leg; said V-shaped caliper member being pivoted at its vertex to said primary leg, so that said outside caliper leg will point to one of said scales to indicate inside measures between said inside leg and said primary leg, and so that said inside leg will point to the other of said scales to indicate outside measures between said outside leg and said primary leg.

In testimony whereof, I have hereunto set my hand at Los Angeles, California, this 15th day of November, 1922.

JOHN L. AVERY.